US007551520B2

(12) United States Patent
Korthals et al.

(10) Patent No.: US 7,551,520 B2
(45) Date of Patent: Jun. 23, 2009

(54) SENSOR FOR A SHORT-RANGE DETECTION SYSTEM AND/OR PARKING SYSTEM OF A MOTOR VEHICLE AND METHOD FOR THE PRODUCTION THEREOF

(75) Inventors: Wilhelm Korthals, Wemding (DE); Juergen Hoenle, Wemding (DE); Dietmar Gruedl, Markgroeningen (DE); Stefan Triebl, Muehlacker (DE)

(73) Assignee: Valeo Schalter und Sensoren GmbH, Bietigheim-Bissingen (DE)

( * ) Notice: Subject to any disclaimer, the term of this patent is extended or adjusted under 35 U.S.C. 154(b) by 286 days.

(21) Appl. No.: 10/567,493

(22) PCT Filed: May 15, 2004

(86) PCT No.: PCT/EP2004/005242

§ 371 (c)(1),
(2), (4) Date: Aug. 30, 2006

(87) PCT Pub. No.: WO2005/024451

PCT Pub. Date: Mar. 17, 2005

(65) Prior Publication Data

US 2007/0017807 A1 Jan. 25, 2007

(30) Foreign Application Priority Data

Aug. 11, 2003 (DE) ................................ 103 37 734
Nov. 3, 2003 (DE) ................................ 203 16 835

(51) Int. Cl.
*G01N 27/26* (2006.01)

(52) U.S. Cl. ...................................................... 367/188
(58) Field of Classification Search .................. 367/188
See application file for complete search history.

(56) References Cited

U.S. PATENT DOCUMENTS

2006/0052491 A1 * 3/2006 Braig et al. .................. 524/99
2007/0017807 A1 * 1/2007 Korthals .................... 204/429

FOREIGN PATENT DOCUMENTS

| | | |
|---|---|---|
| DE | 197 44 229 | 4/1999 |
| DE | 100 07 050 | 8/2001 |
| DE | 100 23 065 | 8/2001 |
| EP | 1 202 249 | 5/2002 |
| EP | 1 316 942 | 6/2003 |
| WO | WO 02/071002 | 9/2002 |
| WO | WO 2005024451 A2 * | 3/2005 |

* cited by examiner

*Primary Examiner*—Dan Pihulic
(74) *Attorney, Agent, or Firm*—Paul Vincent

(57) ABSTRACT

The invention relates to a sensor (12) for a short-range detection system and/or parking system of a motor vehicle, especially an ultrasound sensor. The sensor comprises a pot-shaped housing (10), whereby the base thereof (14) is embodied as an oscillating membrane. The housing comprises a coating on at least the outer side. The invention is characterized in that the coating is made of powder (18) which is weather-proof, which can be coated and which has no or no significant negative influence upon the oscillation behavior of the membrane. The invention also relates to a method for the production of this type of sensor.

13 Claims, 1 Drawing Sheet

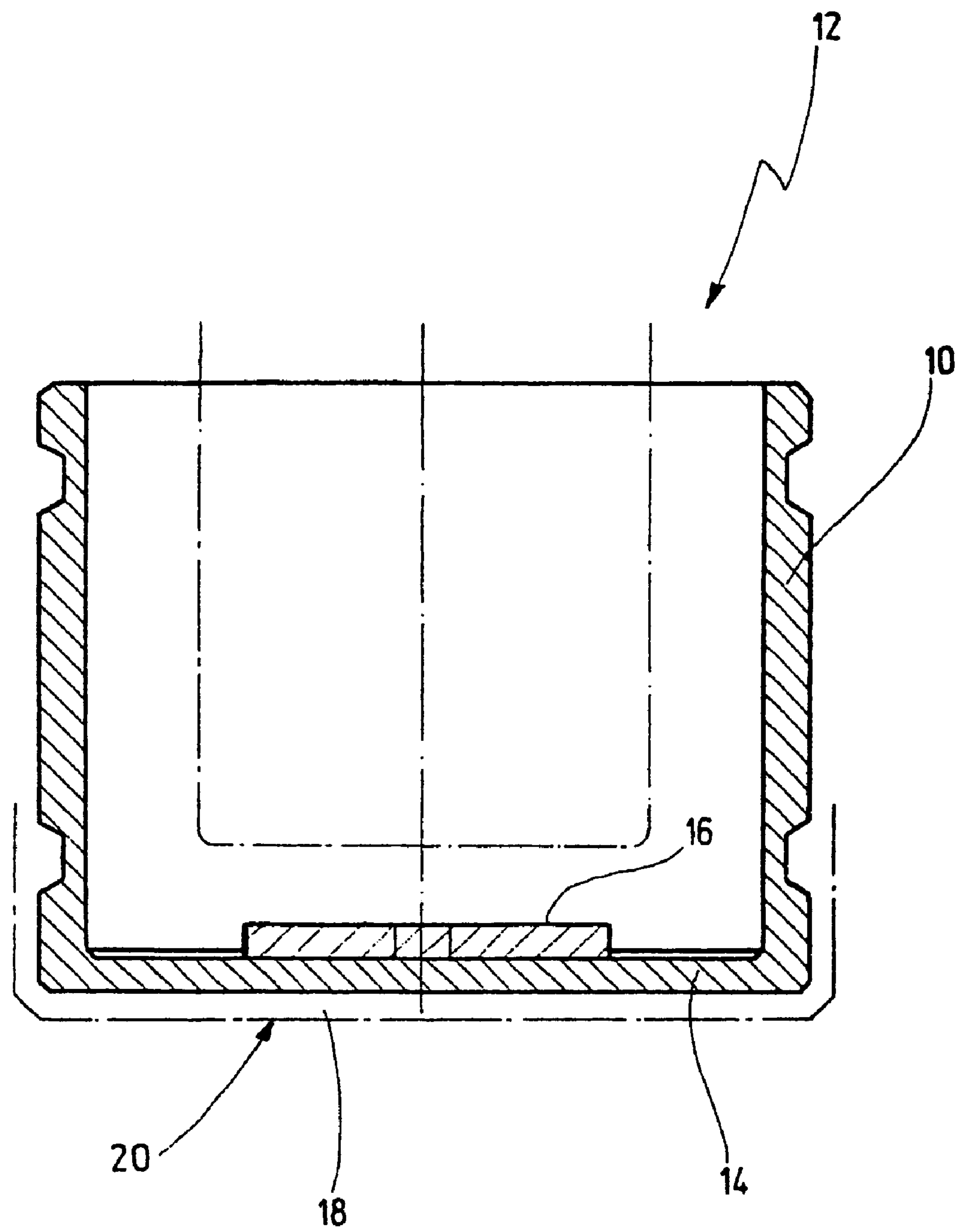
Fig.

SENSOR FOR A SHORT-RANGE DETECTION SYSTEM AND/OR PARKING SYSTEM OF A MOTOR VEHICLE AND METHOD FOR THE PRODUCTION THEREOF

This application is the national stage of PCT/EP2004/005242 filed on May 15, 2004 and also claims Paris Convention priority of DE 103 37 734.4 filed on Aug. 11, 2003 and of DE 203 16 835.6 filed on Nov. 03, 2003.

BACKGROUND OF THE INVENTION

The invention concerns a sensor for a short range detection or parking assistance system for a vehicle, in particular an ultrasound sensor having a pot-shaped housing whose floor is configured as a vibration-capable membrane, wherein the housing has a layer on at least the outer side thereof. Sensors of this kind are known in the art in a plurality of different embodiments.

The sensors emit signals which can be reflected from objects in the vicinity of the motor vehicle and can then once more be received by the sensors. Information concerning objects in the vicinity of the vehicle can be extracted from the differences between the sent and received signals.

Conventional sensors are either anodized or coated by cathodic immersion painting (CIP). A black anodized coating has turned out to be advantageous if the sensors are to be installed in a vehicle having a black color. In the event that the sensors are to be painted with the color of the vehicle, the CIP coating has turned to be advantageous as an intermediate bonding agent for the corresponding paint. A CIP coating is, however, not resistant to the elements and therefore must be coated by a further paint. Installation of the sensor having a CIP coating in the non-painted state is therefore not possible. Moreover, coating of the sensor must not impair the mechanical vibration behavior of the membrane. Interference with the vibration behavior could lead to false results and therefore unusable measuring values.

It is therefore the underlying purpose of the present invention to introduce a sensor of the above mentioned kind having a suitable coating which does not impair the vibration properties of the membrane. Moreover, the coating should permit installation of the sensor without additional coatings or paintings: the coating should be resistant to weather conditions.

SUMMARY OF THE INVENTION

This purpose is achieved with a sensor of the above mentioned kind in that the coating is made from a weather resistant powder which can be painted over and which does not effect the vibration properties of the membrane or does so to a negligible extent. It has surprisingly turned out that a powder coating does not impair the vibration performance of the membrane to such an extent that measurements are not possible. A small negative side effect of the powder coating can occur if the coating interferes or attenuates the radiation and receiving capability of the sensor, but nevertheless allows the sensor to be reasonably effective for near range recognition and parking assistance. Attenuation of the reception or transmission properties of the membrane can be compensated for, for example, through a change in the sensitivity of the sensor. The powder coating has the advantage that it is resistant to the elements and it can be painted over. Sensors having housings with powder coatings can be subsequently painted over or can be installed in the vehicle in an unpainted state. It is particularly advantageous in the event that the powder coating is black, since black housings of sensors do not leave a negative optical impression. In the event that the sensors should already be produced having the color of the vehicle, it is possible to appropriately paint the housing.

In an advantageous embodiment of the invention, the housing is made from a metallic material and the powder coating is directly deposited onto the metallic material. No additional layer i.e. an anodized layer or a CIP layer is thereby disposed between the material and the powder coating. Despite the fact that the powder layer is directly provided on the metallic material, it does not affect or minimally affects the vibration behavior of the membrane.

In accordance with the invention, an intermediate layer can also be introduced between the metallic material and the powder coating. Such an intermediate layer can e.g. be applied during pre-treatment of the metallic material and can be several micrometers thick.

Aluminum has turned out to be an advantageous material. Aluminum or aluminum alloys have an advantageous vibration behavior, in particular in combination with the powder coating. Towards this end, an appropriate agent can be used for pre-treatment of the aluminum. Phosphoric acid has turned out to be particularly advantageous, in particular NABADUR (STI/156) produced by NABU Oberflaechentechnik GmbH in D-92507 Nabburg. In addition, the aluminum should be subject to a chrome free pre-treatment, in particular using NABUTAN (STI/310) produced by NABU Oberflaechentechnik GmbH in D-92507 Nabburg. A thin layer made from NABUTAN can then be disposed between the metallic material and the powder coating.

In a preferred embodiment of the invention, the powder coating is an acrylic powder, a polyester powder, and/or an epoxy powder. A metallic powder paint has turned out to be particularly advantageous that is available under the commercial name ALESTA (AC3004-4905122/AC3S20-9051) produced by the company Dupont Pulverlack Deutschland GmbH & Co. KG, D-84051 Essenbach-Altheim.

Should the sensors be installed in a painted bumper, at least sections of the powder coating can be painted over using the appropriate color of the vehicle. The painting can be effected prior to assembly of the sensors or subsequent to assembly, together with the vehicle and the corresponding housing portion.

The invention also concerns a housing for a sensor in accordance with the invention having a powder coating.

The above mentioned purpose is also achieved with a method for the production of a sensor in accordance with the invention or a housing for the sensor in accordance with the invention which is characterized in that the housing is coated with a powder for production of the coating. For powder coating, the material, in particular aluminum, is coated with a corresponding powder with the assistance of electrostatic charging (EPS). The powder is subsequently burned in an oven at object temperatures between approximately 180 degrees to 220 degrees and is transformed during this process into a powder coating. As soon as the components are cooled they can be directly installed or further coated or painted with an additional coating.

The powder coating has the advantages of high mechanical resistance and optimal corrosive protection. Nevertheless, it does not negatively influence the vibration performance of the membrane.

Further details and advantageous configurations of the invention can be extracted from the following description in which the invention is illustrated with respect to the embodiments shown in the drawing and more closely described and explained.

BRIEF DESCRIPTION OF THE DRAWING

The sole FIGURE illustrates a longitudinal section through the housing and sensor in accordance with the invention.

DESCRIPTION OF THE PREFERRED EMBODIMENT

The FIGURE shows a housing 10 for the sensor 12 in accordance with the invention in longitudinal section. The housing 10 is pot-shaped and has a floor 14. The floor 14 constitutes a vibration-capable membrane which can be caused to vibrate by means of a piezo unit 16 disposed on the inner side of the floor 14. The piezo unit 16 is driven by an electronics which is accommodated in the pot-shaped housing (not shown in the FIGURE). A powder coating 18 is provided on the outer side of the housing 10, and is represented by the dashed-dotted lines 20. In order to match the housing to the color of the vehicle, the powder coating 18 can have a further painted coating. The outer side of the housing 10 of the sensor 12 must not be completely covered with powder. It is only important that the regions which are exposed to the elements, in particular the floor 14, are given a powder coating 18.

The powder coating 18 is preferably an acrylic powder coating. It has turned out to be particularly advantageous in the event that a coating using the commercial product ALESTA (Dupont) is utilized. An intermediate layer which is pre-treated or which serves to protect the aluminum can be disposed between the material of the housing 12 (which is preferentially made from aluminum or an aluminum alloy) and the powder layer 18.

All the features in the description and the subsequent claims as well as those shown in the drawing can be important to the invention individually or in arbitrary mutual combination.

We claim:

1. A sensor for a short range detection or parking assistance system in a vehicle, the sensor comprising:

a pot-shaped housing having a floor configured as a vibration membrane; and a weather resistant, paintable powder coating disposed on at least an outer side of said housing and covering said vibration membrane, said coating structured and dimensioned to permit adequate vibration performance of said membrane.

2. The sensor of claim 1, wherein the sensor is an ultrasound sensor.

3. The sensor of claim 1, wherein said housing is made from a metallic material, with said powder coating being disposed directly onto said metallic material.

4. The sensor of claim 1, wherein said housing is made from a metallic material, and further comprising an intermediate layer disposed between said metallic material and said powder coating.

5. The sensor of claim 1, wherein said housing comprises aluminum or an aluminum alloy.

6. The sensor of claim 1, wherein said powder coating is manufactured from at least one of an acrylic powder, a polyester powder, and an epoxide powder.

7. The sensor of claim 1, wherein said powder coating has a black color.

8. The sensor of claim 1, wherein at least sections of said powder coating are painted.

9. A method for the production of the sensor of claim 1, wherein said housing is coated with powder to effect said powder coating.

10. The method of claim 9, wherein said housing is painted following said powder coating.

11. The method of claim 9, wherein said housing is constructed without further treatment.

12. The method of claim 9, wherein said housing is pretreated prior to said powder coating.

13. The method of claim 12, wherein said pretreatment comprises introduction of an intermediate layer.

* * * * *